(12) United States Patent
Graham

(10) Patent No.: US 8,522,704 B2
(45) Date of Patent: Sep. 3, 2013

(54) STITCHED PERFORATED SHEET MATERIALS

(75) Inventor: Sichel Graham, Crewe (GB)

(73) Assignee: Bentley Motors Limited (GB)

( * ) Notice: Subject to any disclaimer, the term of this patent is extended or adjusted under 35 U.S.C. 154(b) by 397 days.

(21) Appl. No.: 13/056,679

(22) PCT Filed: Jul. 30, 2009

(86) PCT No.: PCT/GB2009/001867
§ 371 (c)(1),
(2), (4) Date: Jan. 31, 2011

(87) PCT Pub. No.: WO2010/013001
PCT Pub. Date: Feb. 4, 2010

(65) Prior Publication Data
US 2011/0135875 A1    Jun. 9, 2011

(30) Foreign Application Priority Data
Jul. 31, 2008  (GB) ..................................... 0813950

(51) Int. Cl.
*B32B 3/24* (2006.01)
*B32B 7/08* (2006.01)
*B68G 7/05* (2006.01)

(52) U.S. Cl.
USPC ................................ 112/475.17; 112/475.01

(58) Field of Classification Search
USPC ........................................ 112/475.17, 475.01
See application file for complete search history.

(56) References Cited

U.S. PATENT DOCUMENTS
4,044,221 A    8/1977  Kuhn
6,415,445 B1 *  7/2002  Nishijima et al. ............. 2/161.4

FOREIGN PATENT DOCUMENTS

| | | |
|---|---|---|
| DE | 201 04 985 | 6/2001 |
| DE | 10 2006 052935 | 6/2007 |
| EP | 1064971 | 3/2001 |
| FR | 2 148 105 | 3/1973 |
| GB | 170457 | 10/1921 |
| GB | 263474 | 12/1926 |
| WO | 2008 045347 | 4/2008 |

* cited by examiner

Primary Examiner — Brent O'Hern
(74) Attorney, Agent, or Firm — Salter & Michaelson

(57) ABSTRACT

A method of producing a stitched perforated sheet material including providing a sheet material (3) with a perforated region 4 and an unperforated region (5). The sheet material is then stitched in the unperforated region, but adjacent to the perforated region. This gives an overall perforated appearance whilst avoiding the problems associated with stitching through a perforated material.

11 Claims, 3 Drawing Sheets

STITCHED PERFORATED SHEET MATERIALS

TECHNICAL FIELD

The present invention relates to a method of producing a stitched perforated sheet material. The invention relates particularly, although not exclusively, to upholstery and upholstery for automotive seating.

BACKGROUND OF THE INVENTION

Perforated leather and like materials are widely used in upholstery, particularly in upholstery of automotive seating. Perforation provides a desirable decorative effect and may be used to create a decorative pattern. It also allows air to pass through the material and this can be desirable in some applications.

When perforated leather or similar materials are stitched, however, a problem arises. The presence of perforations tends to distort an intended line of stitching. This happens because the sewing machine needle tends to preferentially enter an existing perforation in the material rather than pierce the material. Thus, unless the direction and pitch of the stitching corresponds exactly to an existing line of perforations, which is in practice unlikely, if not impossible, stitching tends to zig-zag between existing perforations spoiling the aesthetic appeal of the finished stitched material.

Embodiments of the present invention have been made in consideration of this problem.

SUMMARY OF THE INVENTION

According to the present invention there is provided a method of producing a stitched perforated sheet material comprising the steps of: providing a sheet material with a perforated region and an unperforated region and stitching the sheet material in the unperforated region but adjacent to the perforated region.

By stitching the material in an unperforated region the problems caused by perforations interfering with the intended path of stitching are avoided. However, by stitching adjacent to the perforated region the resulting stitching and associated holes through the material effectively blend in with the existing perforations giving an overall more aesthetically pleasing result than with conventional methods. Even where stitching is not visible the invention gives an improved result since stitching can more accurately follow a desired path.

The sheet material may comprise leather, suede, alcantara, imitations thereof, plastics material or any other suitable material. The sheet of material may comprise one or more layers of material.

The material may be stitched in a direction which is substantially parallel to an edge of the perforated region. The material may be stitched so that the stitching which is formed is spaced apart from an edge of the perforated region at a distance which is substantially the same as a distance between adjacent rows of perforations in the perforated region. As such, the line of stitching and associated stitch holes will effectively form an additional row of perforations in the perforated region. Depending upon the desired effect to be achieved, stitching may be spaced from an edge of the perforated region by any suitable distance consistent with forming a desired pattern which may be a regular pattern and the distance may be approximately an integer number of multiples of a distance between adjacent rows of perforations within the perforated region.

The pitch of the stitching may be substantially the same as, or different to, the pitch of perforations within the perforated region.

The unperforated region may be formed within a perforated region and/or may lie between two perforated regions. There may be more than one perforated region and/or more than one unperforated region. The unperforated region may comprise one or more strips or bands of unperforated material extending through a perforated region. Two or more unperforated bands may run parallel to each other or they may intersect. The width of an unperforated band of material may be substantially twice the distance between adjacent rows of perforations within a perforated region. As such, a line of stitching may be formed mid-way along the unperforated region to give a completely perforated appearance.

In one embodiment the sheet material is perforated with a diamond pattern with perforated diamond shaped regions separated by unperforated regions along which stitching is subsequently formed to produce a diamond quilted effect. In a similar embodiment two substantially parallel lines of stitching are formed along each unperforated region.

Thread used to stitch the material may correspond in colour to the material or it may be a contrasting colour to the material.

The method may involve folding the material and stitching folds into the material to create a desired decorative effect, for example fluting.

The stitched material may be comprised in upholstery and the invention includes materials and articles formed by the method. In particular, materials stitched according to the method may be used to form automotive seating and trim.

DESCRIPTION OF THE DRAWINGS

In order that the invention may be more clearly understood embodiments thereof will now be described by way of example with reference to the accompanying drawings of which.

DETAILED DESCRIPTION

Figure 1:
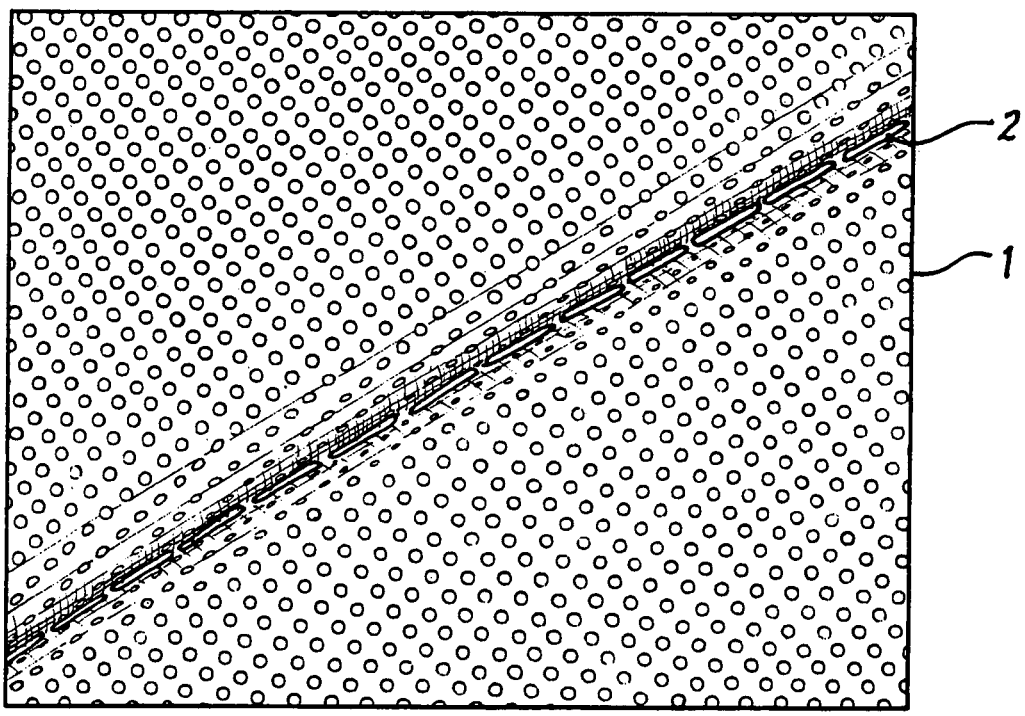
FIG. 1 shows a plan view of a conventional stitched piece of perforated leather.

FIG. 1 shows a prior art sheet of perforated leather 1 with a line of stitching 2 running across the material. The material 1 is perforated with a regular pattern of evenly spaced perforations extending in parallel spaced apart straight lines. A line of stitching 2 has been formed across the material using a conventional sewing machine. The stitching tends to zig-zag between perforations in the material. Consequently, the line of stitching is not even or straight and this spoils the appearance of the stitched material.

Figure 2:
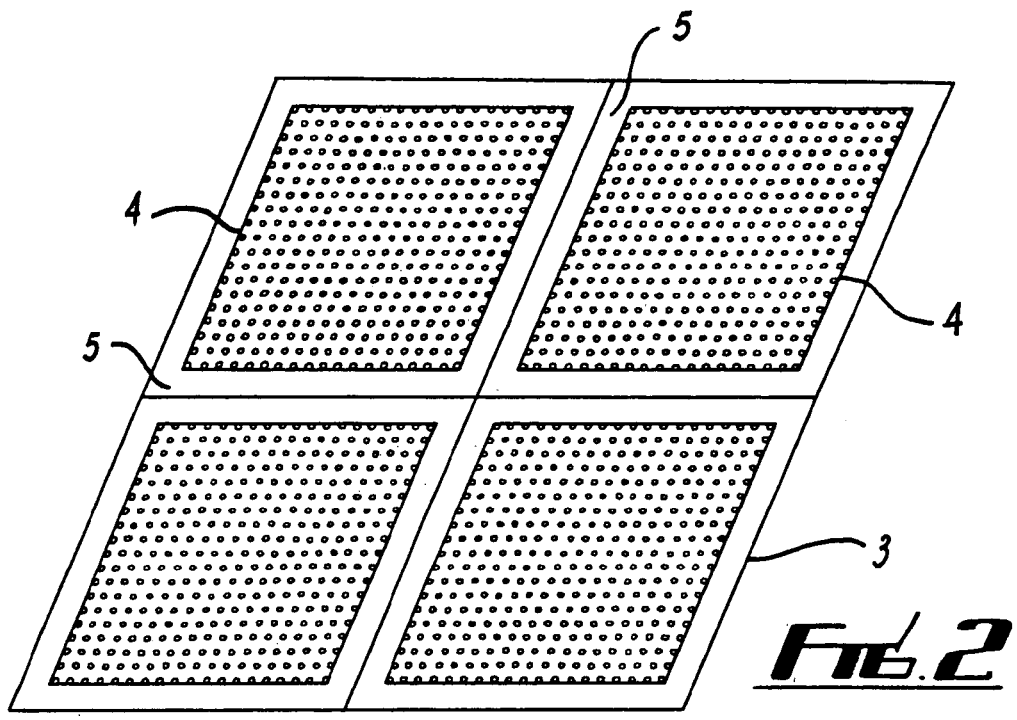
FIG. 2 shows a plan view of part of a perforated sheet of leather for use in a method according to the invention.
Figure 3:
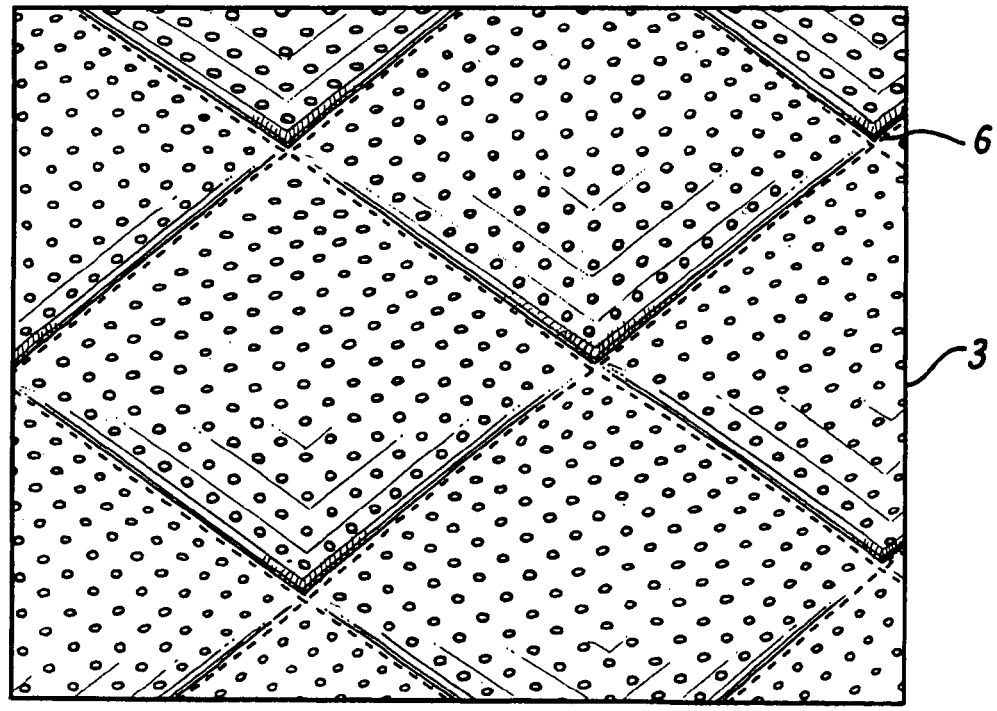
FIG. 3 shows the material of FIG. 2 stitched in accordance with an embodiment of the invention to form a quilted material.

Referring now to FIGS. 2 and 3 the method according to the invention involves provision of a sheet of material 3, in this case leather, having one or more perforated regions 4 separated by unperforated regions 5. In this embodiment each perforated region is substantially diamond shaped and formed by a series of parallel evenly spaced apart lines of perforations. The unperforated regions 5 comprise unperforated bands of material extending between the perforated regions to form the diamond shapes. The width of the unperforated bands (between adjacent perforated regions) is substantially twice the distance between adjacent lines of perforations within the perforated regions. As such, it will be appreciated that if an extra line of perforations were added mid-way along each perforated band the result would be a material perforated all over in the manner of that shown in FIG. 1.

The material shown in FIG. 2 is intended to be used in forming a diamond quilted effect. Two achieve this the material is stitched together with other appropriate layers of material with the stitching 6 running substantially along the centre of each unperforated band of material to form the result shown in FIG. 3. As the stitching is carried out only along unperforated material the path of the stitching is not affected by the presence of existing perforations. It is therefore possible to form the stitching in a desired direction, in this case in straight lines. Depending upon the effect to be achieved the stitching may, as shown, be contrasting to the material and may be formed with a different pitch to the existing perforations in the material. The resulting stitched material has a more even and aesthetically pleasing appearance than the conventional stitched material shown in FIG. 1.

Figure 4:
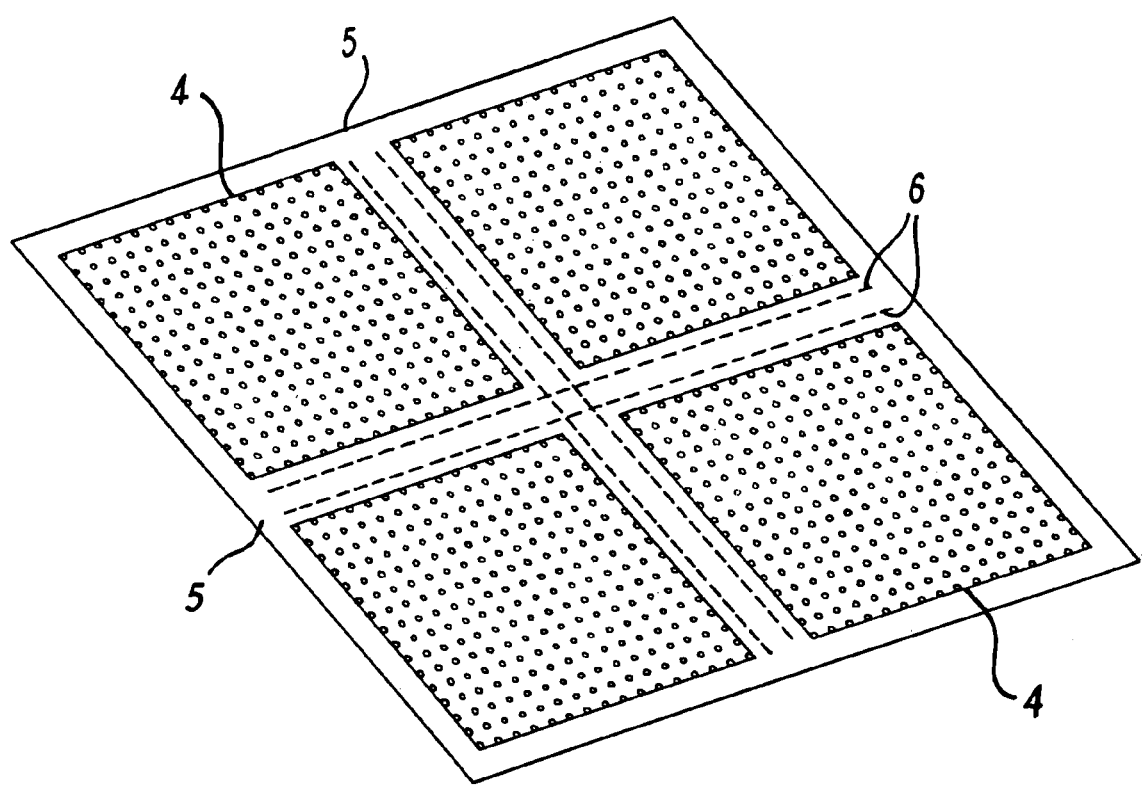
FIG. 4 shows the material of FIG. 2 stitched in accordance with another embodiment of the invention to form a quilted material.

In another embodiment a sheet of material generally as shown in FIG. 2 is stitched with substantially parallel rows of stitches 6 in each unstitched region 5 to form an alternative finished appearance, as shown in FIG. 4.

The above embodiments are described by way of example only. Many variations are possible without departing from the invention.

What is claimed is:

1. A method of producing upholstery or automotive trim comprising the steps of: providing a sheet material with at least one perforated region comprising a plurality of adjacent spaced apart rows of perforations and at least one unperforated region and stitching the sheet material in the at least one unperforated region but adjacent to the at least one perforated region to form a line of stitching which is spaced apart from an edge of the perforated region by a distance which is substantially an integer number of multiples of a distance between adjacent rows of perforations in the perforated region.

2. A method as claimed in claim 1 wherein the sheet material comprises leather, suede, alcantara, imitations thereof or plastics material.

3. A method as claimed in claim I wherein the sheet material comprises multiple layers.

4. A method as claimed in claim 1 wherein the sheet material is stitched in a direction which is substantially parallel to the edge of the perforated region.

5. A method as claimed in claim 1 wherein the stitching is spaced apart from the edge of the perforated region at a distance which is substantially the same as a distance between adjacent rows of perforations in the perforated region.

6. A method as claimed in claim 1 wherein the unperforated region is formed within a perforated region and/or lies between two perforated regions.

7. A method as claimed in claim 1 wherein the unperforated region comprises one or more strips or bands of unperforated material extending through a perforated region.

8. A method as claimed in claim 7 wherein the width of the unperforated strip or band of material is substantially twice the distance between adjacent rows of perforations within the perforated region.

9. A method as claimed in claim 8 wherein a line of stitching is formed mid-way along the unperforated region to give a completely perforated appearance.

10. A method as claimed in claim 1 wherein the sheet material is perforated with a diamond pattern with perforated diamond shaped regions separated by unperforated regions along which stitching is subsequently formed to produce a diamond quilted effect.

11. A method as claimed in claim 10 wherein two substantially parallel lines of stitching are formed along each unperforated region.

* * * * *

UNITED STATES PATENT AND TRADEMARK OFFICE
CERTIFICATE OF CORRECTION

PATENT NO. : 8,522,704 B2  
APPLICATION NO. : 13/056679  
DATED : September 3, 2013  
INVENTOR(S) : Graham Sichel Page 1 of 1

It is certified that error appears in the above-identified patent and that said Letters Patent is hereby corrected as shown below:

Title page (12) under UNITED STATES PATENT, delete "Graham" and insert -- Sichel --;

Title Page (75) after INVENTOR, delete "Sichel Graham" and insert -- Graham Sichel --; and In the Specifications In Column 3, line 10, delete "Two achieve this" and insert -- To achieve this. --.

Signed and Sealed this  
Fourth Day of February, 2014

Michelle K. Lee  
*Deputy Director of the United States Patent and Trademark Office*